United States Patent
Leung

(10) Patent No.: US 6,766,478 B2
(45) Date of Patent: Jul. 20, 2004

(54) PROTECTIVE CIRCUIT FOR PROTECTING HARD DISK DATA

(76) Inventor: Kwok-Yan Leung, 53, Applegate Cres., Willowdale ON (CA), M2H 2R5

(*) Notice: Subject to any disclaimer, the term of this patent is extended or adjusted under 35 U.S.C. 154(b) by 531 days.

(21) Appl. No.: 09/798,522

(22) Filed: Mar. 3, 2001

(65) Prior Publication Data

US 2002/0133739 A1 Sep. 19, 2002

(51) Int. Cl.[7] .............................................. G06F 11/00
(52) U.S. Cl. ............................ 714/42; 714/5; 714/7; 714/23; 714/36
(58) Field of Search ..................... 714/5, 7, 23, 36, 714/42

(56) References Cited

U.S. PATENT DOCUMENTS

| | | | | |
|---|---|---|---|---|
| 6,317,845 B1 | * | 11/2001 | Meyer et al. ................. | 714/23 |
| 6,345,346 B1 | * | 2/2002 | Biessener et al. ............ | 711/162 |
| 6,484,269 B1 | * | 11/2002 | Kopylovitz ................... | 714/5 |
| 6,502,205 B1 | * | 12/2002 | Yanai et al. .................. | 714/7 |
| 6,591,376 B1 | * | 7/2003 | VanRooven et al. .......... | 714/36 |

OTHER PUBLICATIONS

"IEEE 100: The Authoritative Dictionary of IEEE Standards Terms." 2000. Standards Information Network, IEEE Press. 7th Edition. p. 570.*

* cited by examiner

Primary Examiner—Nadeem Iqbal
Assistant Examiner—Christopher Euripidou

(57) ABSTRACT

A protective circuit for protecting hard disk data comprises: a first HD coupling device connected to a hard disk port of motherboard; a second HD coupling device connected to a hard disk; a HD signal processor coupled to the first HD coupling device, the second HD coupling device, and a microprocessor respectively; a random access memory (RAM) connected to the microprocessor; a nonvolatile semiconductor memory having program codes for converting a read/write instruction of the hard disk port on the motherboard with respect to the hard disk from a main data space to a virtual data space thereof; and the microprocessor for running program codes. The protective circuit can recopy the data in the main data space to the virtual data space in the case that the data stored in the virtual data space are corrupted.

5 Claims, 4 Drawing Sheets

1. Please Key in value of main data space(MB):____

2. Setup mode at first time

3. Switch to mode of virtual data space

FIG. 3

PROTECTIVE CIRCUIT FOR PROTECTING HARD DISK DATA

FIELD OF THE INVENTION

This invention relates generally to protective circuits for protecting data, particularly to a protective circuit for protecting hard disk data arranged between a Hard Disk Drive (HDD) and the motherboard in the form like an Integrated Drive Electronics (IDE) interface.

BACKGROUND OF THE INVENTION

A protective circuit for protecting hard disk data is usually made in the form of an interface card and plugged in an Industry Standard Architecture (ISA) slot or a Peripheral Component Interconnect (PCI) slot. The measure of the protective circuit is more or less concerned with the operating system (O/S) set in a hard disk and is mostly limited in intercepting the interruption instruction INT 13 of the widely known Basic Input/Output System (BIOS) chip(s) lying on the motherboard for operating a Hard Disk Drive (HDD). Therefore, a protective circuit based on Microsoft operating system may not be compatible with that of Apple series, namely, the protective measure is somewhat dependent on an operating system. Besides, a user has to install a related driver in addition to a conventional protective circuit, which cannot function anymore when the driver is damaged or disabled.

SUMMARY OF THE INVENTION

The primary object of this invention is to provide a protective circuit for protecting hard disk data, which is located between a motherboard and a hard disk (HD) drive and is irrespective of any operating system or driving program.

The protective circuit should comprise:
a first HD coupling device connected to a hard disk port of a motherboard;
a second HD coupling device connected to a hard disk;
a HD signal processor coupled to: the first HD coupling device, the second HD coupling device, and a microprocessor;
a random access memory (RAM) connected to the microprocessor;
a nonvolatile semiconductor memory having program codes for switching a read/write instruction of the hard disk port on the motherboard with respect to the hard disk from a main data space to a virtual data space thereof; and
the microprocessor for running the program codes.

In case the data stored in the virtual data space are damaged, the protective circuit of this invention can be applied to recopy the data in the main data space to the virtual data space to revive the latter.

For more detailed information regarding this invention together with advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which:

FIG. 3 shows a menu of running an external program code.

DETAILED DESCRIPTION OF THE PREFERRED EMBODIMENT

Figure 1:
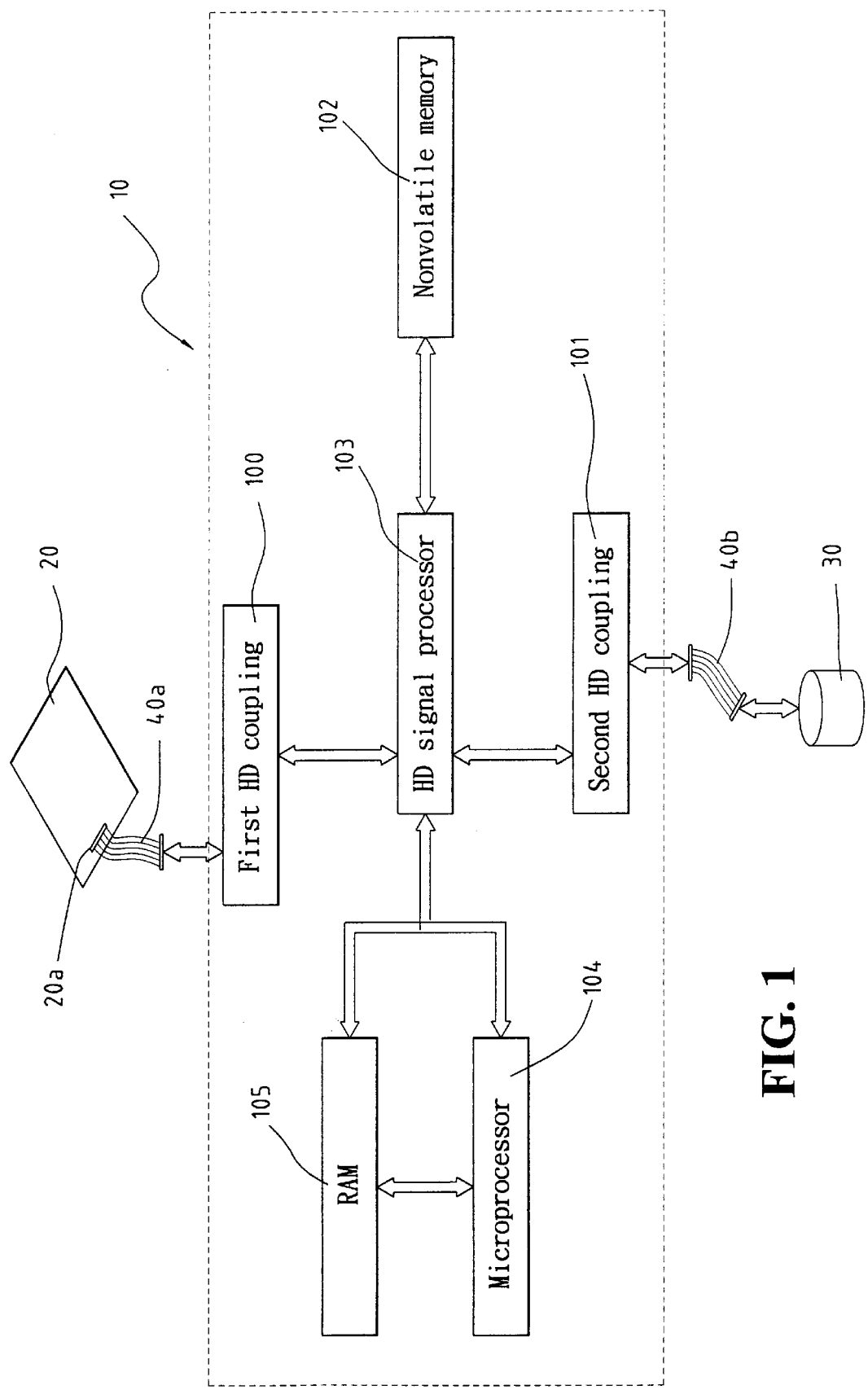
FIG. 1 shows the architecture of this invention.

Based on the architecture of this invention shown in FIG. 1, a protective circuit for protecting hard disk (HD) data 10 comprises a first HD coupling device 100, a second HD coupling device 101, a HD signal processor 103, a random access memory (RAM) 105, a programmed nonvolatile semiconductor memory 102, and a microprocessor 104. The first HD coupling device 100 is connected with a hard disk port 20a on a motherboard 20 while the second HD coupling device 101 is connected with a hard disk (HD) 30. The HD signal processor 103 is the hub connected with the first and the second HD coupling devices 100, 101, as well as the microprocessor 104 respectively. And moreover, the RAM 105 is coupled to the microprocessor 104.

The microprocessor 104 is to run a program code in the semiconductor memory 102 to convert a read/write command for access of a main data space in the HD 30 into a virtual data space.

An Integrated Drive Electronics (IDE) interface is generally disposed on a conventional motherboard 20 for jointing with an IDE hard disk drive or a CD ROM drive. In a preferred embodiment of the protective circuit 10 of this invention, both the first and the second HD coupling devices 100, 101 are IDE couplings and connected to the hard disk port 20a on the motherboard 20 and to the HD 30 through a ribbon cable 40a, 40b respectively.

Figure 2:
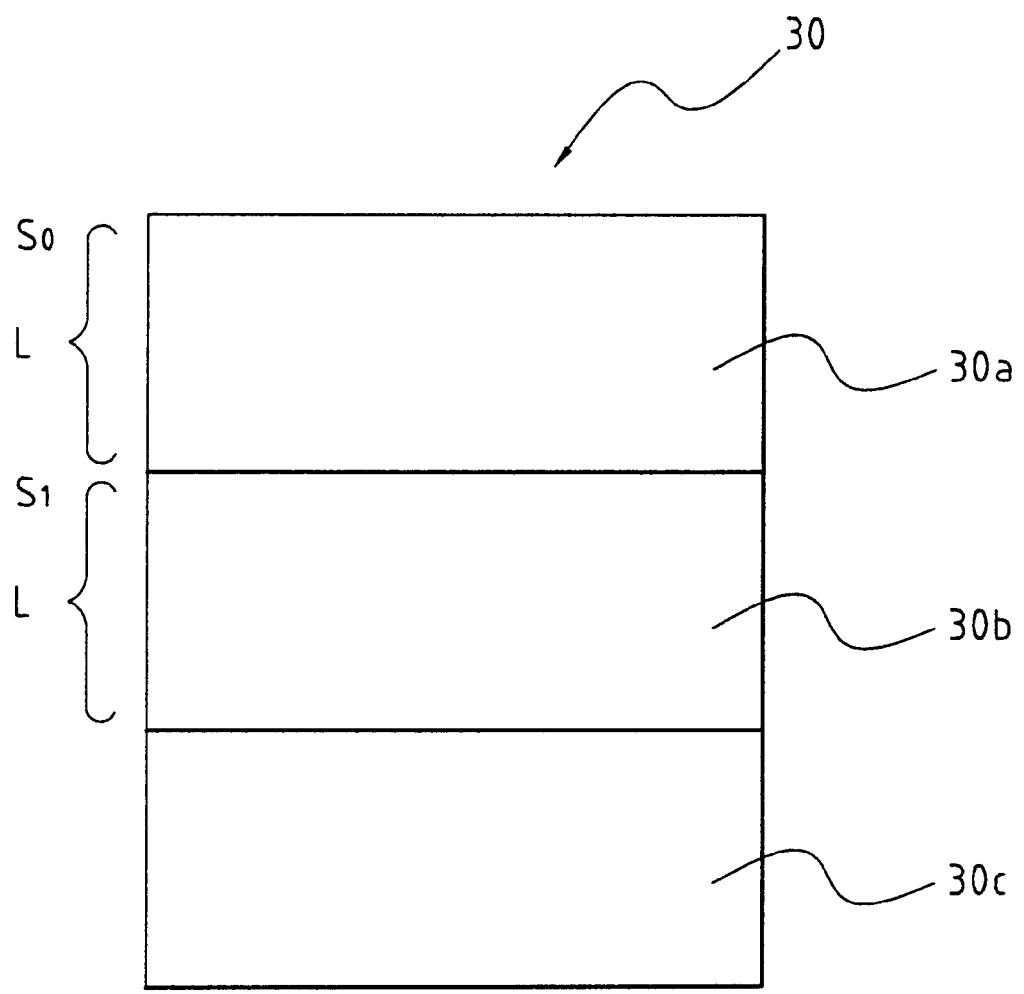
FIG. 2 is a schematic view showing that a hard disk is partitioned into a main and a virtual data space.

According to the protective circuit 10, the HD 30 must be partitioned in advance into a main and a virtual data space 30a, 30b as shown in FIG. 2. The main data space 30a and the virtual data space 30b are two HD spaces equal to L with respect to an initial address S0, S1, wherein the magnitude of space L and the data space 30a, 30b can be defined or partitioned by running an external program code. As shown in FIG. 3, when a user chooses item 1 to key in 1000, the HD 30 is partitioned into a main and a virtual data space 30a, 30b in 1000 MB equally, wherein the main data space 30a is used to store an installed bulky software like the Microsoft Window operating System, maybe plus the Microsoft Office application software. The user may choose item 2—setup mode at the first time—for installing operating system and application software to the main data space 30a After completion of the setup job, he may now choose item 3 to enter a virtual-data-space switching mode, and the protective circuit 10 would switch and copy all the data stored in the main data space 30a to the virtual data space 30b, so that all the read/write requests afterwards are allowed to access the virtual data space 30b instead, and thereby protect the operating system and application software stored in the main data space 30a.

Such a switch-measure has built a firewall surrounding the main data space 30a to allow virus to invade the virtual data space 30b only. In the case of virus invasion, a user may resume FIG. 3 and enter item 3 again, the protective circuit 10 would recopy all the data in the main data space 30a to the virtual data space 30b one more time and rebuild the operating system and application software in the latter. Moreover, a remaining space 30c, if any, in the partitioned HD 30 is treated as a logic HD to the operating system.

Figure 4:
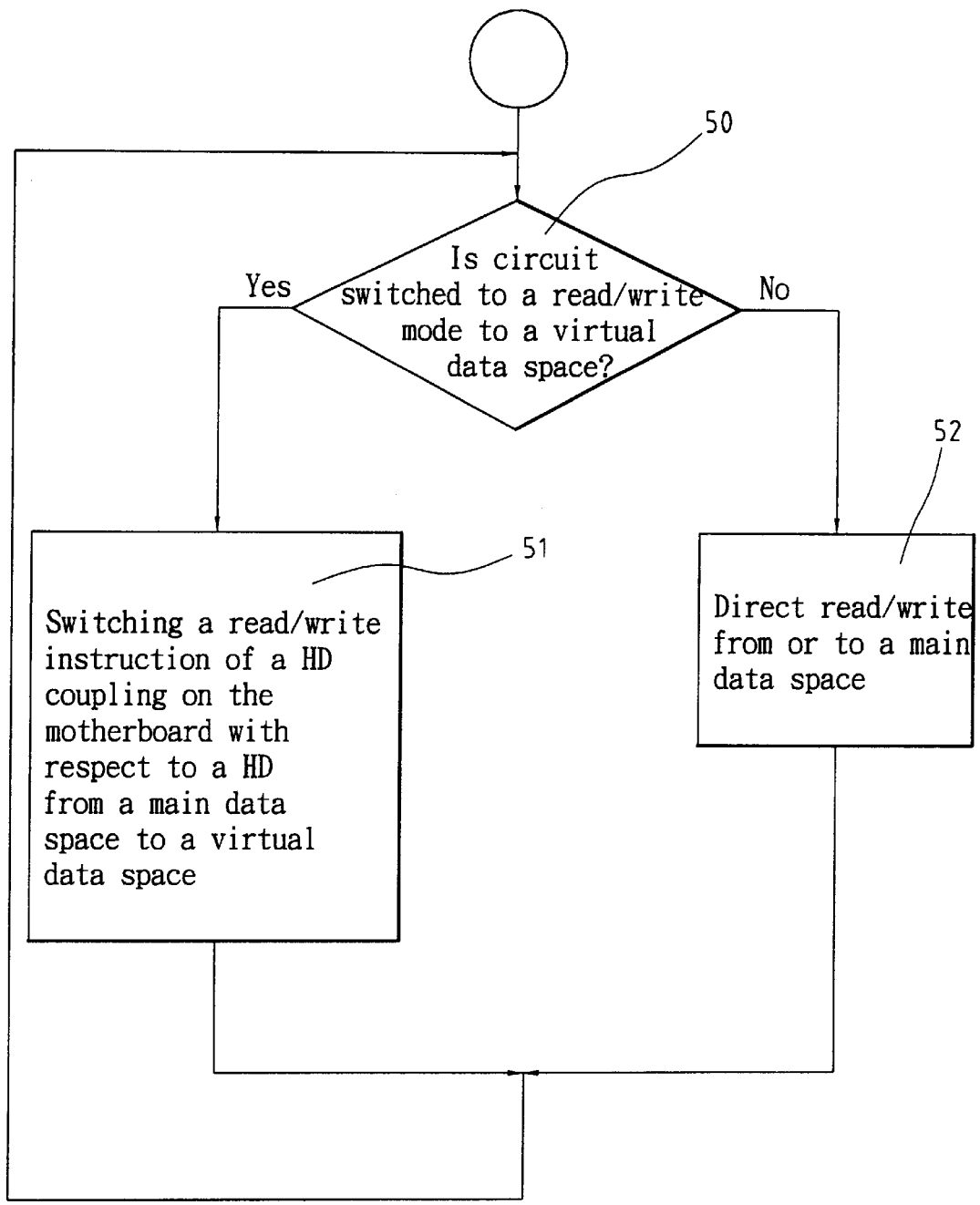
FIG. 4 is a flowchart for infusing the program code of this invention into a nonvolatile semiconductor memory.

In a flowchart for infusing the program code of this invention into a nonvolatile semiconductor memory shown in FIG. 4, the procedure in step 50 is to judge whether the protective circuit 10 is switched to a read/write mode of the virtual data space 30*b*; if positive, it goes to step 51, or to step 52 otherwise. In the step 51, a read/write instruction of the hard disk port 20*a* on the motherboard 20 applied to the main data space 30*a* is converted into that of the virtual data space 30*b*. For example, the hard disk port 20*a* on the motherboard 20 effects a read/write instruction with respect to an absolute address S0+xx in the main data space 30*a*. The step 51 is to convert the address S0+xx in the main data space 30*a* into a corresponding address S1+xx in the virtual data space 30*b*. The protective circuit 10 is normally in this conversion mode. The step 52 is to read/write the main data space 30*a* directly through the hard disk port 20*a* on the motherboard 20. For instance, when a read/write instruction is effected from the motherboard 20 through the hard disk port 20*a* to a S0+xx address in the main data space 30*a*, the step 52 is to read/write data from or to the address S0+xx in die main data space 30*a* directly, namely, the step 52 is usually applied in this setup mode when the first time the operating system and application software are installed. After the first time a user has installed operating system and application software in the main data space 30*a*, he may run an external program code to copy the data in the main data space 30*a* to the virtual data space 30*b*. The protection circuit 10 can then be switched to the conversion mode for normal operation.

Flash memory may be adopted as the nonvolatile semiconductor memory 102 of this invention for updating the inside program code more conveniently.

The external program code may be stored in a floppy disk to be read by a floppy disk drive (not shown) and run by a CPU (not shown) disposed on the motherboard 20, or integrated in the BIOS (not shown) of the motherboard 20 and run by a predetermined hot key when booting a computer system.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A protective circuit for protecting bard disk data, comprising:

a first hard disk coupling device connected to a hard disk port of a motherboard;

a second hard disk coupling device connected to a hard disk;

a hard disk signal processor coupled to the first hard disk coupling device, the second hard disk coupling device, and a microprocessor;

a random access memory (RAM) connected to the microprocessor; and a nonvolatile semiconductor memory having program codes for running in the microprocessor to convert a read/write instruction from/to a main data space of the hard disk into a read/write instruction from/to a virtual data space in a conversion mode or executing a direct read/write instruction from/to the main data space in a setup mode;

wherein if data stored in the virtual data space are corrupted, the protective circuit is controlled to copy the data in the main data space to the virtual data space to recover the virtual data space.

2. The protective circuit according to claim 1, wherein the first hard disk coupling device is an Integrated Drive Electronics (IDE) coupling device.

3. The protective circuit according to claim 1, wherein the second hard disk coupling device is also an IDE coupling device.

4. The protective circuit according to claim 1, wherein an external program code is used to partition the hard disk (HD) connected to the second hard disk coupling device into the main data space and the virtual data space.

5. The protective circuit according to claim 1, wherein the main data space in the hard disk is arranged for storing an operating system.

* * * * *